Dec. 27, 1966   J. P. GREGERSEN   3,293,672
MACHINE FOR STRIPPING HONEY-COMBS
Filed Jan. 14, 1965   6 Sheets-Sheet 1

INVENTOR.
JEROME P. GREGERSEN
BY
Dugger, Braddock, Johnson & Westman
ATTORNEYS

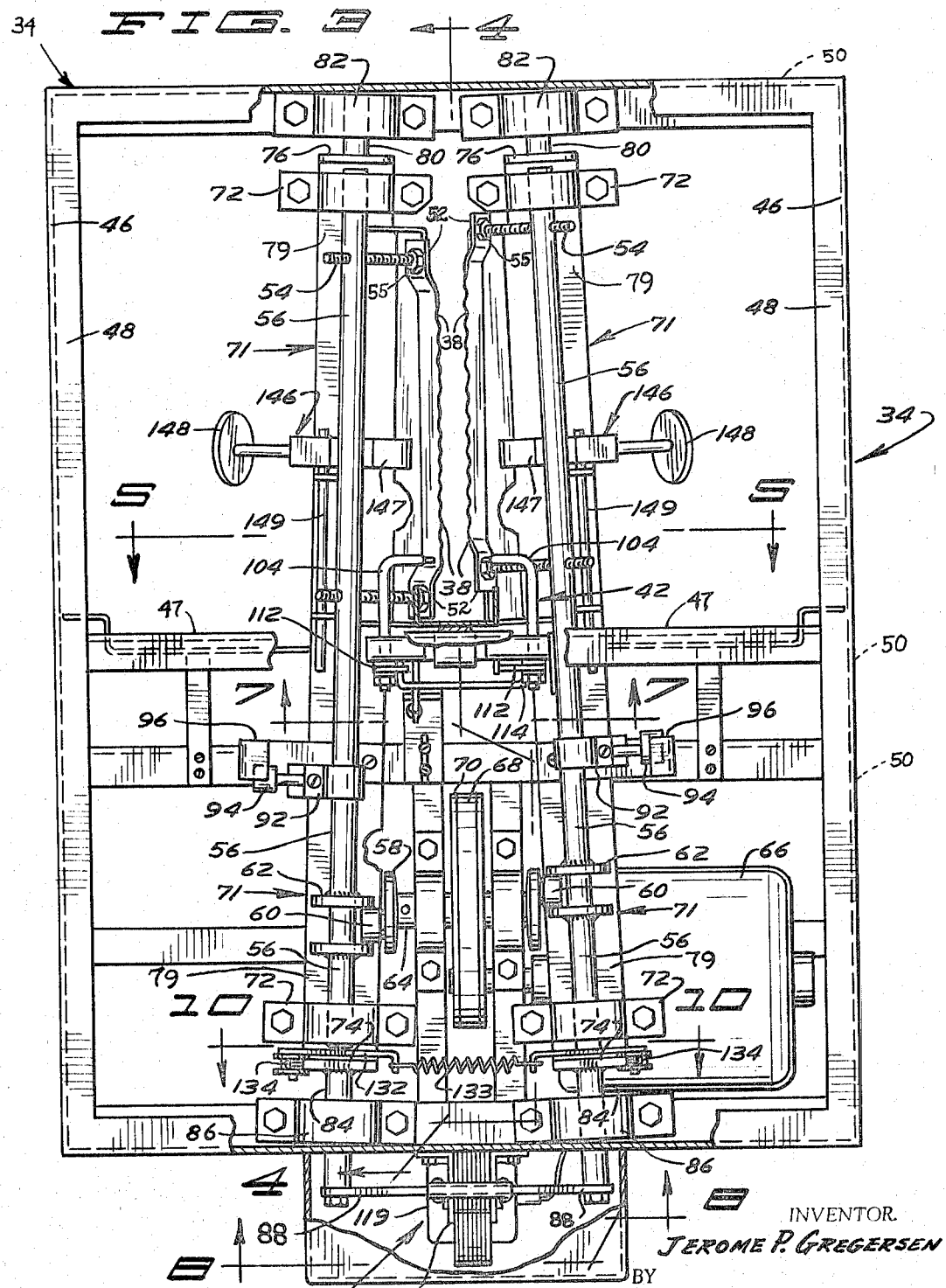

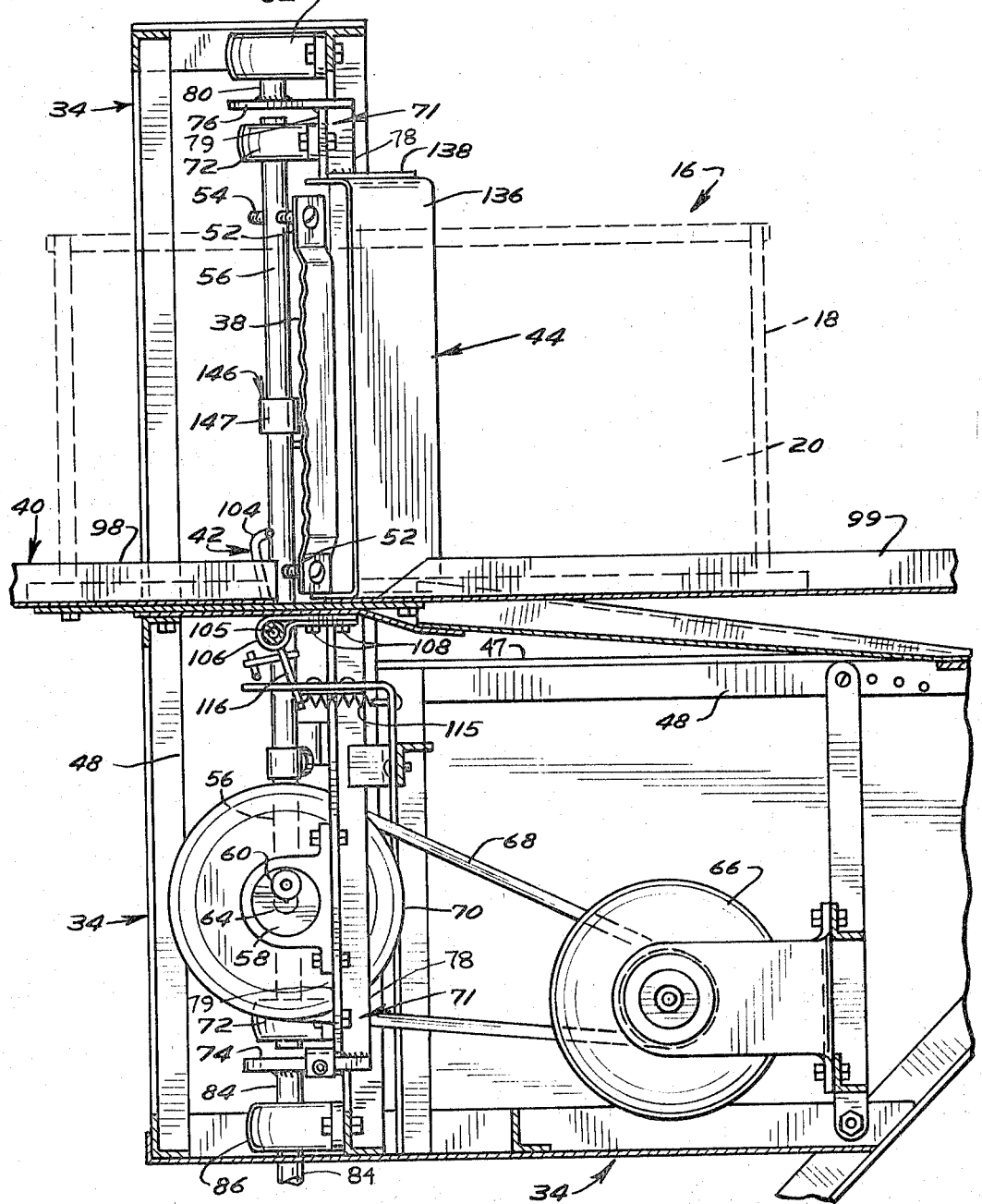

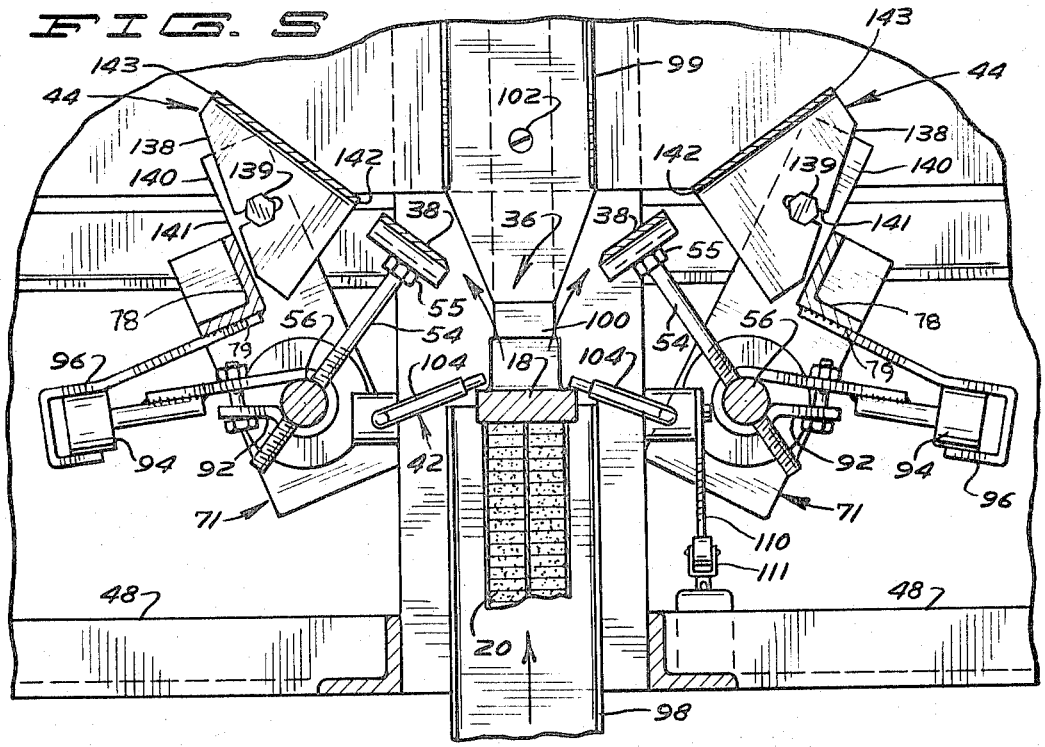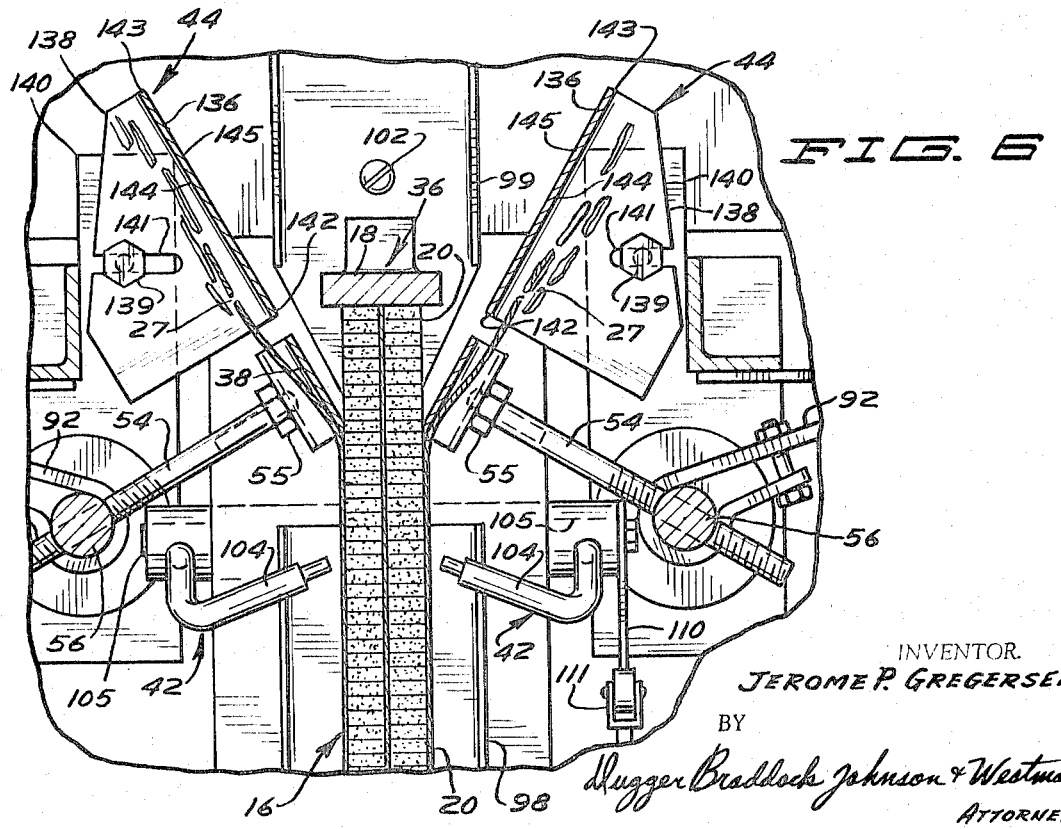

Dec. 27, 1966  J. P. GREGERSEN  3,293,672
MACHINE FOR STRIPPING HONEY-COMBS
Filed Jan. 14, 1965  6 Sheets-Sheet 5

INVENTOR.
JEROME P. GREGERSEN
BY
Dugger Braddock Johnson & Westman
ATTORNEYS

Dec. 27, 1966  J. P. GREGERSEN  3,293,672
MACHINE FOR STRIPPING HONEY-COMBS
Filed Jan. 14, 1965  6 Sheets-Sheet 6
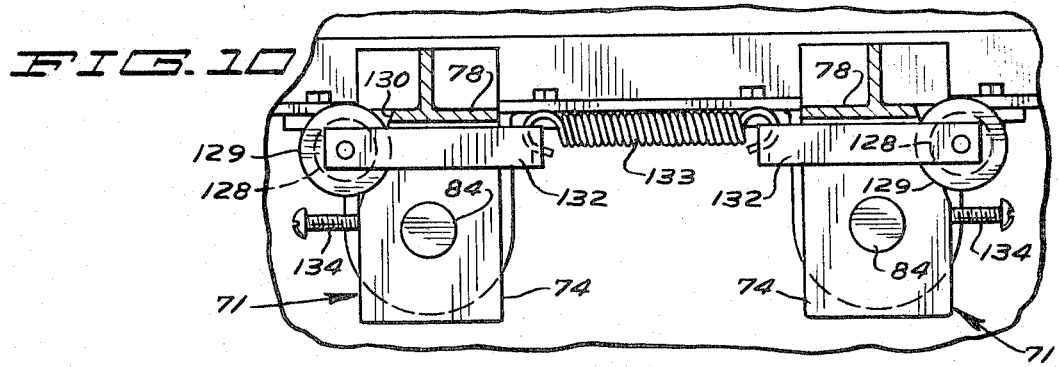
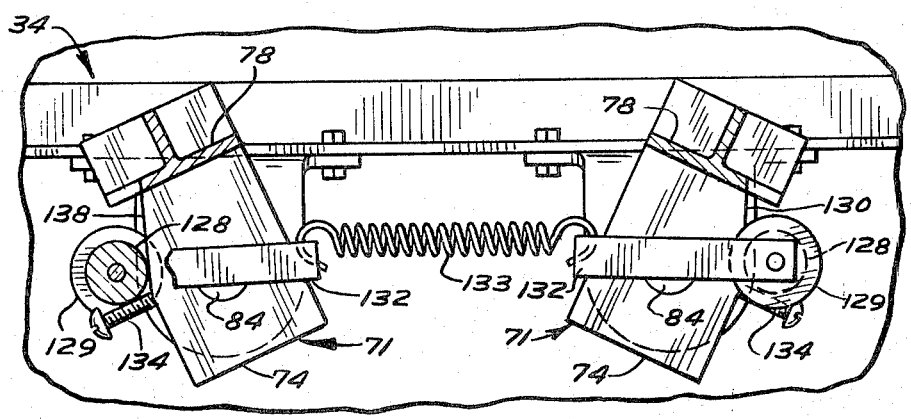
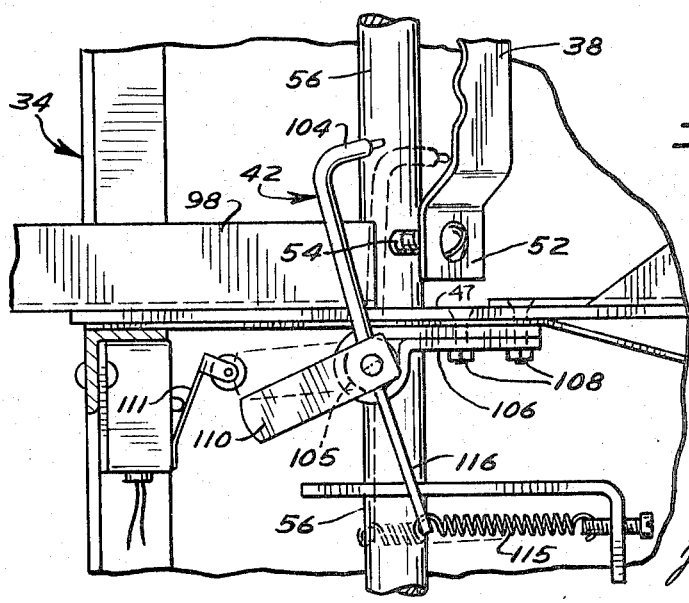
INVENTOR.
JEROME P. GREGERSEN
BY
Dugger Braddock
Johnson & Westman
ATTORNEYS

United States Patent Office

3,293,672
Patented Dec. 27, 1966

3,293,672
MACHINE FOR STRIPPING HONEY-COMBS
Jerome P. Gregersen, 7152 Medicine Lake Road,
Minneapolis, Minn. 55912
Filed Jan. 14, 1965, Ser. No. 425,386
2 Claims. (Cl. 6—12)

This invention relates to a machine for uncapping the cells of honeycombs, preparatory to extraction of the honey by known methods.

The desirability of somehow providing a simple, inexpensive, yet effective machine for uncapping honeycombs has been accentuated recently by the marked growth of apiculture in the United States. The past few decades have witnessed substantial increases in the number of people engaged in beekeeping for profit as well as for hobby. In the design of a machine for removing or stripping beeswax which seals the opposite ends of the comb cells, there are several definite practical limitations which arise, several of which arise as a result of the construction of the honeycomb itself. The typical honeycomb such as used in the Langstroth hive employs an outer wood frame which provides an artificial casing for the honeycomb. Accordingly, the uncapping machine must be designed to accommodate this construction. A further limitation is imposed by the fact that honeycombs are not uniform in thickness and therefore the machine must be capable of adjusting to these dimensional variations.

Another limitation which has constantly haunted the apiculturist arises because of the fragile construction of the cells themselves. Although the clever bee has advantageously adopted the stronger hexagonal design, the cell structure is nevertheless susceptible to tearing and mutilation when subjected to the rough cutting action of the conventional uncapping machines.

The problems inherent in cutting the honeycomb are further aggravated by the sticky beeswax which tends to accumulate on the cutting blades, thereby making it extremely difficult to cut the honeycomb without extensive damage. It is well-known that the prior art devices have attempted to solve this problem by heating the cutting blades, such as by steam or electrical resistance. It is equally well-known that such devices require a conglomeration of equipment which is both costly and dangerous. In addition, the presence of heat has been found to cause certain adverse effects on the quality and taste of the honey. Further considerations as to loading accessibility and convenience, as well as size, shape and reliability go far in pointing out the disadvantages of the prior art devices which are now available.

It is therefore the principal object of this invention to eliminate the shortcomings inherent in the prior art devices and to provide a machine which automatically accommodates the wood frame construction of a conventional honeycomb, which is capable of positive and efficient cutting action without the use of heat and without damage to either the comb or honey, which is compact in design and readily adaptable for use, and which is relatively inexpensive to manufacture.

Another object of this invention resides in the provision of a honeycomb uncapping machine which is easily and conveniently loaded and which provides a continuous gravity feed of the comb through the machine.

Still another object of the invention resides in the versatile manner the machine may be adjusted for honeycomb of varying thicknesses.

Other objects will become apparent as the description proceeds.

In the drawings,

FIG. 3 is a sectional view taken along the line 3—3 of FIG. 1;

FIG. 4 is a fragmentary elevation taken on the line 4—4 in FIG. 3, and partially in section, showing the main internal components of the invention;

FIG. 5 is an enlarged sectional view taken along the line 5—5 of FIG. 3 showing parts of the machine in non cutting position;

FIG. 6 is a view similar to FIG. 5, but showing the same parts in cutting position;

FIG. 10 is an enlarged view taken along the line 10—10 of FIG. 3 showing in detail a sub-assembly of the actuating mechanism;

FIG. 11 is a view similar to FIG. 10 showing the sub-assembly in its opened position; and FIG. 12 is an enlarged sectional view taken along the line 12—12 in FIG. 2.

Figure 1:
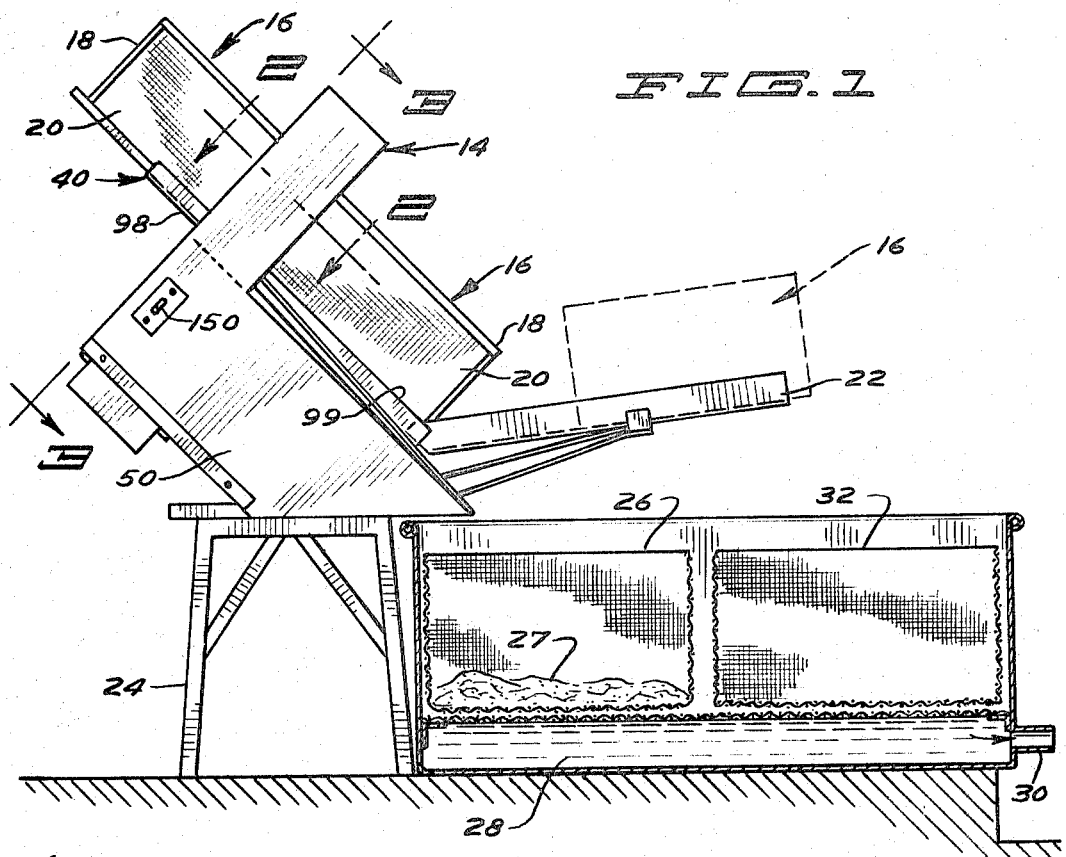
FIG. 1 is an elevational view with parts in section and parts broken away showing the overall machine at a work station for preparing the honeycomb for the extraction process.

Referring to the drawings, and particularly to FIG 1, the stripping machine 14 is shown in conjunction with a work station for stripping the honeycomb sections 16 preparatory to the extraction process which is carried out by known means (not shown). The honeycomb sections are of conventional structure and include an outer wood frame 18 which serves as an artificial foundation for the comb cell structure 20. The honeycomb sections 16 are normally fed successively into the stripping machine with the trailing edge of the first honeycomb section abutting the leading edge of the second honeycomb section. Following the stripping operation, the honeycomb sections are conveyed by gravity and assume the dotted line position on outrigger tray 22 where they are then ready to be fed into the extractor.

At 24 is shown a metal stand for supporting the machine in the inclined position shown, the advantage of which will become clear as the description proceeds. Perforated basket 26 is suitably disposed for collection of the waste clippings 27 which are discharged from the machine and also receives any honey drippings which occur while the honeycomb is positioned on the outrigger tray 22. This residual honey is filtered into a reservoir 28 which is periodically tapped at outlet 30. Basket 32 is used as a replacement for basket 26 when the latter becomes filled with clippings.

The stripping machine according to the invention comprises generally a frame 34, a cutting station 36 which includes a pair of reciprocating cutter blades 38, conveyor means 40 for continuously conveying the honeycomb throughout the stripping operation, an actuating mechanism 42 for actuating the blades into and out of cutting position, and discharge means 44 for directing the waste clipping 27 away from the blades and out of the machine. Each of these essential components will now be described in detail.

The frame

The frame 34, best shown in FIGS. 3 and 4, is constructed of outer angle members 46 and inner transverse angle members 47 which are interconnected so as to form a network of inwardly depending flanges 48 which in turn support the various internal components of the machine. The composite framework thus provided is encased by sheet metal panels 50 which contribute to a pleasing overall appearance of the machine.

The cutting station

The cutting station 36 includes the laterally spaced cutter blades 38 having the offset end portions 52 which are secured to blade support bars 54 through weld nuts 55. The blade support bars 54 in turn threadably engage the reciprocating rods 56 that are driven by eccentrics 58 having roller came surfaces 60 which engage split collars 62 formed on the rods 56. The eccentrics 58 are driven by a common shaft 64 which is in driving connection with the motor 66 by means of V-belt 68 and pulley 70.

There is thus provided a continuous linkage for imparting high frequency reciprocating motion to the cutter blades 38, i.e., rotary motion of the pulley 70 is converted to reciprocating motion of the rods 56 (by means of the eccentrics 58) and the reciprocating motion of the rods 56 is directly transferred to the cutter blades 38 through the support bars 54.

As best shown in FIGS. 3 and 4, the longitudinal axes of the cutter blades 38 are disposed in parallel spaced relation, and each blade includes a sinuous or scalloped cutting edge which is beveled. The cutter blades 38 are mounted perpendicular to the support bars 54 which are inclined inwardly whereby the blades are disposed so as to define a rake angle less than 45 degrees when the cutter blades are in their normal cutting position.

Each of the reciprocating rods 56 are mounted at their upper and lower ends to inner sub-frame members 71 by means of pivot bearings 72. The sub-frame members 71 each comprise a rectangular base plate 74, a top depending flange 76, and a longitudinally extending T-shaped section 78 which in turn presents the flat inner surface 79 for mounting the pivot bearings 72 thereon. Welded to the top surfaces of the depending flanges 76 are the upper shaft extensions 80 which extend upwardly and are received by upper stationary bearings 82. Similarly, welded to the bottom surface of base plates 74 are the lower shaft extensions 84 which extend downwardly and are received by lower stationary bearings 86.

Figure 8:
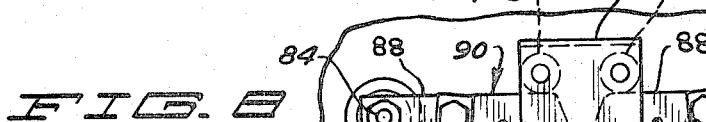
FIG. 8 is an enlarged view taken along the line 8—8 of FIG. 3.
Figure 9:
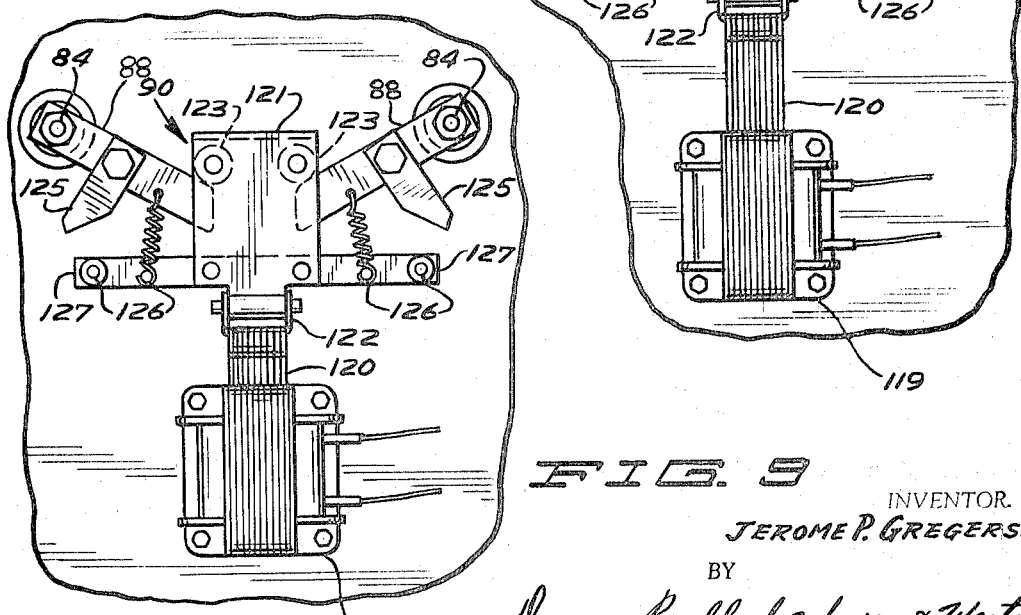
FIG. 9 is a view similar to FIG. 8, illustrating the operation of the mechanism for actuating the reciprocating blades into their non-cutting position.

As best seen in FIGS. 8 and 9, the lowermost ends of the lower shaft extensions 84 are bolted to coacting lever arms 88 that constitute part of the solenoid lever assembly 90. Although the solenoid lever assembly 90 will be subsequently described in greater detail, it suffices for the present to say that it is designed to cause opposed partial rotation of the lower shaft extensions 84. Since the latter are in turn welded to the base plates 74 of the sub-frame members 71, any rotation of the lower shaft extensions is correspondingly transferred to the sub-frame members. This same rotation is imparted to the reciprocating rods 56 via a pair of clamps 92 (see FIG. 5) which are secured to rods 56 and have at their outer ends bearing blocks 94 which engage retainers 96. The retainers 96 are fixedly secured to inner surface 79 of the sub-frame members 71 whereby any pivotal or rotational movement of the sub-frame members 71 will be imparted to the rods 56 by the linkage of the retainers 96 with the clamps 92. Note that the retainers 96 are designed to allow the bearing blocks 94 to reciprocate rectilinearly in a direction corresponding to that of the rods 56.

The conveyor means

The conveyor means 40 for conveying the honeycomb sections throughout the stripping operation includes a U-shaped inlet tray 98 and a similar U-shaped outlet tray 99. These trays are interconnected in the vicinity of the cutting station by the tongue 100 which is secured by screw fasteners 102. The upper surface of the tongue 100 serves as a support for the honeycomb sections 16, as they are being transferred from tray 98 to tray 99. There is thus provided a continuous channel or conveyor for guiding the honeycomb sections throughout the stripping operation. As shown in FIG. 1, the conveyor means so formed is inclined downwardly with respect to the horizontal, corresponding to the inclination of the machine itself. A downward angle of approximately 45°, as shown in FIG. 1 of the drawings, has proved excellent, as will be readily appreciated, means are thus provided for advantageously feeding the honeycomb sections by gravity. The outrigger tray 22 which receives the honeycomb sections as they leave the outlet tray 99, is disposed at an angle slightly above the horizontal to cause the honeycomb sections to come to rest thereon.

The actuating mechanism

The primary purpose of the actuating mechanism, generally designated 42, is to move the cutter blades 38 in and out of cutting engagement with the cell structure 20 of the honeycomb sections. It is also designed to swing the blades 38 clear of the outer wood frame 18 when the latter occurs in the vicinity of the blades. To achieve this, the actuating mechanism includes several intricate sub-assemblies which operate automatically to insure that the blades are cutting at the proper time and place. The first of these sub-assemblies to be described is the feelers or sensors for detecting the presence of the honeycomb sections as they are fed in and through the cutting station.

Figure 2:
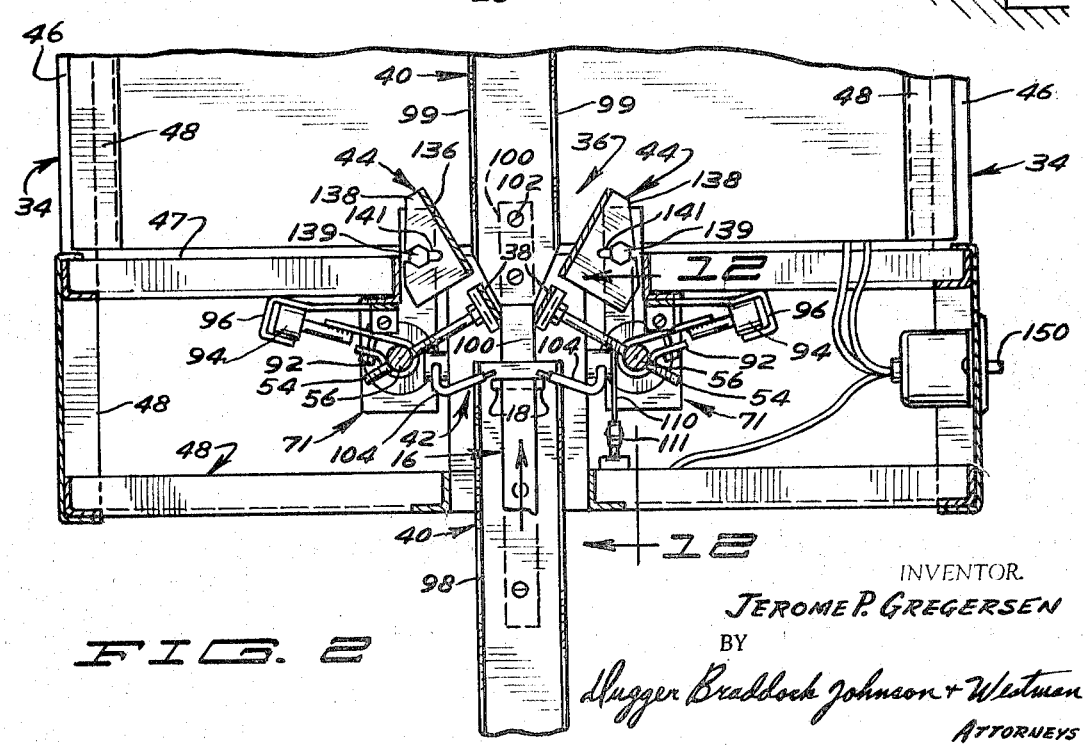
FIG. 2 is a sectional view taken along the line 2—2 of FIG. 1.
Figure 7:
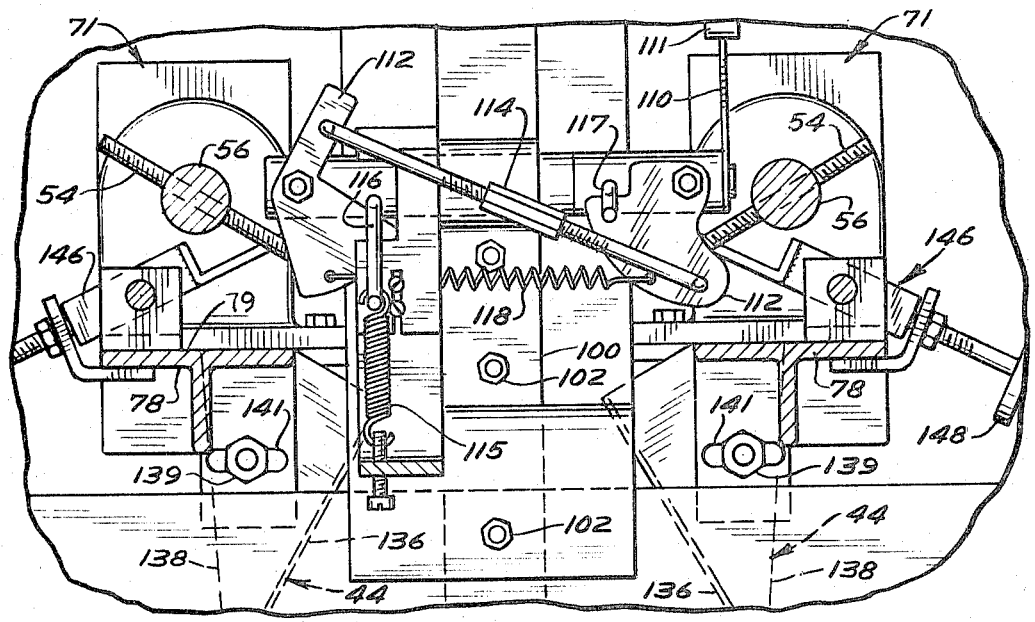
FIG. 7 is an enlarged view taken along the line 7—7 of FIG. 3.

FIG. 2 shows the blades in their normal cutting position as the honeycomb section 16 is fed into position for stripping. As the wood frame 18 enters it comes in contact with a pair of laterally spaced feelers 104 that pivot about a horizontally aligned shaft 105. As best seen in FIG. 12, the shaft 105 is rotatably mounted within a hook bracket 106 which is in turn mounted to the transverse frame member 47 by bolts 108. At the outer end of the shaft 105 is the lever arm 110 which engages a roller lever switch 111 as the feelers assume their "open" position. The "open" position of the feelers 104 contemplates the dotted line position of FIG. 12 or the position they assume after being pushed forwardly to clear the wood frame 18. In addition, each of the feelers 104 is adapted to partially rotate about their longitudinal axis. To achieve this, the shaft 105 is suitably bored so as to provide a sleeve fit for the feelers received therein. As illustrated in FIG. 7, the lower ends of the feelers are respectively bolted to coacting crank plates 112 which are interconnected by an adjustable link member 114. Spring 115 connected to pin 116 biases the shaft 105 and consequently urges the feelers 104 into their normally "closed" position. Stop 117 limits the rotation of the crank plates 112, and consequently the rotation of the feelers about their longitudinal axes.

Accordingly, the feelers 104 are subjected to two types of movement as the honeycomb section passes through, namely, the partial pivotal movement about the shaft 105 and the partial rotational movement about their longitudinal axes. Upon the initial contact of the wood frame 18 with the tip portions of the feelers, the feelers jointly pivot forwardly about the common shaft 105. Further movement of the honeycomb section causes the feelers to spread (due to their joint partial rotation) sufficiently to clear the wood frame 18. Consequently, the switch 111 closes as the lever arm 110 swings upwardly into engagement therewith. The length of the feelers is such that they make a definite contact with frame 18 as it passes. However, after the wood frame has passed, the feelers return to their "closed" position (due to the action of spring 115) and straddle the cell structure 20 with a slight clearance. In addition, the crank plates 112 are provided with a spring 118 which also urges the feelers into their normally "closed" position. The spring 118 provides suitable bias to the feelers yet will allow them to rotate slightly to conform to normal aberrations in the cell structure of the honeycomb sections.

The solenoid lever assembly 90 is best shown in FIGS. 8 and 9 and comprises a solenoid 119 which is electrically controlled by the roller lever switch 111 and has a plunger 120 which is in driving connection with a base plate 121 by means of a clevis connector 122. Mounted on the upper surface of the base plate 121 are the spaced rollers 123 which are suitably placed so as to operatively engage the inner ends of the coacting lever arms 88. Lever arms 88 have their opposite ends secured to the lower shaft extensions 84 and thus are adapted to be pivoted about the longitudinal axes thereof. Also, since the lower shaft extensions 84 are in turn linked to the sub-frame members 71, pivotal movement of the lever arms 88 causes the desired pivotal movement of the sub-frame members. Consequently, the cutter blades 38 being mounted in conjunction with the frame members 71 are subject to this same pivotal movement. Pivotal movement of the lever arms 88 is caused by the withdrawal of the solenoid plunger 120 as shown in FIG. 9. Thus the solenoid lever assembly 90 provides an automatic power means for swinging the blades into their non-cutting positions when the switch 111 is closed in the manner previously described.

Provision is made for urging the solenoid lever assembly 90 into a fully closed or locked position by the lugs 125 which come to rest between the stops 126 that are mounted on base plate extensions 127.

FIGS. 10 and 11 show a sub-assembly for insuring that the sub-frame members 71 are biased to either a fully opened or, alternately, a fully closed position. This provides a safety feature since without this sub-assembly the heavy vibrational forces generated by the machine may be sufficient to cause the sub-frame members to assume intermediate positions, and consequently present the danger of completely closing at an improper time. Included in the sub-assembly are the bearing rollers 128 having the peripheral flanges 129 which rest on the top surfaces of base plates 74. The rollers 128 engage the contoured bearing surfaces 130 provided on the outer edges of the base plates 74. Interconnecting the rollers 128 are the straps 132 and extension spring 133. As will be readily understood, the flanged rollers 128 will urge the sub-frame members 71 to the fully closed position of FIG. 10 due to the bearing of the rollers upon the contoured surfaces 130. When the sub-frame members are moved into their fully opened positions by the solenoid lever assembly 90, the rollers 128 move jointly along the surfaces 130 and eventually assume the position of FIG. 11. The stops 134 are suitably positioned to restrain each of the rollers 128 in their over-the-center positions.

*The discharge means*

The discharge means 44 is designed to direct the waste clippings away from the cutter blades 38 so accumulation of waste material thereon is minimized. In addition, the waste material is kept from the general vicinity of the cutting station and thus precluded from contaminating other parts of the machine. Ultimately, the waste clippings 27 are deposited in the perforated basket 26. To achieve this complete removal of the waste material there is disclosed a pair of diverging guide elements 136, each of which are mounted between the substantially triangular mounts 138. The mounts 138 are in turn secured by bolts 139 to the depending supports 140 formed on the sub-frame members 71. Provision is made for adjusting the positions of guide elements 136 with respect to the cutter blades by the slotted guides 141 which receive the bolts 139. The guide elements 136 include the leading and trailing edges 142 and 143, respectively, and inner and outer surfaces 144 and 145, respectively. As best seen in FIG. 6, the guide elements 136 are arranged so as to be in coplaner alignment with the cutter blades 38 whereby the waste clippings 27 are received immediately adjacent the trailing portion of the blades and are then directed along the inner surfaces 144 of the guide elements 136. The waste clippings which pass the trailing edges 143 merely fall by gravity into the perforated basket 26.

Since the discharge means 44 is fixedly mounted in conjunction with the sub-frame members 71, it will also swing outwardly together with the cutter blades 38 when the sub-frame members are pivoted to their opened positions.

An accessory to the machine is shown at 146 and consists of a pair of adjustable guides having the contoured end members 147 which are adapted to straddle the honeycomb sections to thereby facilitate proper feeding of the honeycomb sections throughout the stripping process. The guides 146 are adjustable laterally by the provision of the cross feed discs 148 and adjustable longitudinally by the provision of the slide bars 149 which serve as mounts for the guides 146.

In summary, the overall operation of the stripping machine is very simple and is carried out automatically. To start the cycle a master switch 150 is turned "on" and this starts the reciprocation of the cutter blades 38. Initially, the blades are in their normally closed positions. As the honeycomb sections 16 are fed through the cutting station, the wood frame thereof contacts the feelers 104 which in turn energizes the solenoid lever assembly 90 via the roller lever switch 111. Consequently, the sub-frame members 71 are partially rotated or pivoted to their opened positions which in turn causes the cutter blades 38 and discharge means 44 (which are mounted on the sub-frame members) to be similarly swung clear of the wood frame of the honeycomb section. After the wood frame has passed, the feelers 104 return to their normal positions, the switch 111 is de-energized, the solenoid lever assembly 90 is closed, and the cutter blades 38 and discharge means 44 are returned to their original positions. The cutter blades 38 will now remain in cutting engagement with the cell structure 20 of the honeycomb sections until the trailing portion of the wood frame 18 comes in contact with the feelers 104. When this happens, the cutter blades and discharge means are again swung clear as the foregoing cycle is repeated.

It is apparent that many modifications and variations of this invention as set forth may be made without departing from the spirit and scope thereof. The specific embodiment described is given by way of example only and the invention is limited only by the terms of the appended claims.

What is claimed is:
1. A machine for uncapping the cells of honeycomb sections having an outer wood frame encasing the marginal portions thereof, said machine comprising:
 (a) a stationary frame;
 (b) a movable sub-frame;
 (c) means defining a cutting station including a pair of spaced reciprocating cutter blades mounted on said movable frame and power drive means for imparting high frequency reciprocating motion to said cutter blades;
 (d) conveyor means comprising a substantially continuous U-shaped tray adapted to receive and progressively advance said honeycomb sections by gravity along a predetermined path;
 (e) actuation means for imparting partial rotation of said movable sub-frame and thereby move said reciprocating blades into and out of cutting engagement with the cells of said honeycomb sections, said actuation means being controlled by the movement of said honeycomb sections through said cutting station; and
 (f) discharge means disposed adjacent said cutting station for directing the waste clipping away from said reciprocating blades, said discharge means compris- ing a pair of diverging flange members situated adjacent said cutting station and being mounted on said movable sub-frame.

2. The combination as specified in claim 1 wherein said actuation means includes locking means for positively holding the blades into cutting relationship said cells for as long as said sections are moving through said station and for releasing said blades and removing said blades from contact with said sections as each of said sections leaves said cutting station.

References Cited by the Examiner
UNITED STATES PATENTS

| | | | |
|---|---|---|---|
| 1,779,469 | 10/1930 | Gran | 6—12 |
| 2,261,529 | 11/1941 | Stroller | 6—12 |
| 2,272,808 | 2/1942 | McFadyen | 6—12 |
| 2,807,034 | 9/1957 | Fox | 6—12 |

SAMUEL KOREN, *Primary Examiner.*
LUCIE H. LAUDENSLAGER, *Examiner.*